Dec. 8, 1931.  W. H. PUGSLEY  1,835,811
ELECTRIC MOTOR
Filed March 19, 1930  2 Sheets-Sheet 1

Inventor:
William H. Pugsley,
By Wm. O. Belt atty.

Dec. 8, 1931.  W. H. PUGSLEY  1,835,811
ELECTRIC MOTOR
Filed March 19, 1930  2 Sheets-Sheet 2

Inventor:
William H. Pugsley,
By Wm. J. Belt
atty.

Patented Dec. 8, 1931

1,835,811

UNITED STATES PATENT OFFICE

WILLIAM H. PUGSLEY, OF HURON, SOUTH DAKOTA, ASSIGNOR OF ONE-THIRD TO RAYMOND PAUL, OF CHICAGO, ILLINOIS

ELECTRIC MOTOR

Application filed March 19, 1930. Serial No. 436,950.

This invention relates to electric motors and the like and among the primary objects of the invention are to provide a motor in which the torque may be varied without altering the current supply; the speed may be maintained constant or gradually varied without altering the current supply; and the rotation may be dampened in proportion to the torque required.

Other objects of the invention are to provide a motor in which certain elements will be relatively rotatable and in which the rotation of either or both of the elements may be dampened; rotation in either direction may be directly derived without interrupting the operation; and in which two independent loads may be driven.

A further object of the invention is to provide a motor which will be protected against burning out due to overloading, stalling, and the like.

Selected embodiments of the invention are shown in the accompanying drawings and, therein, Fig. 1 is a longitudinal sectional view of an electric motor embodying one form of my invention;

Figure 1:
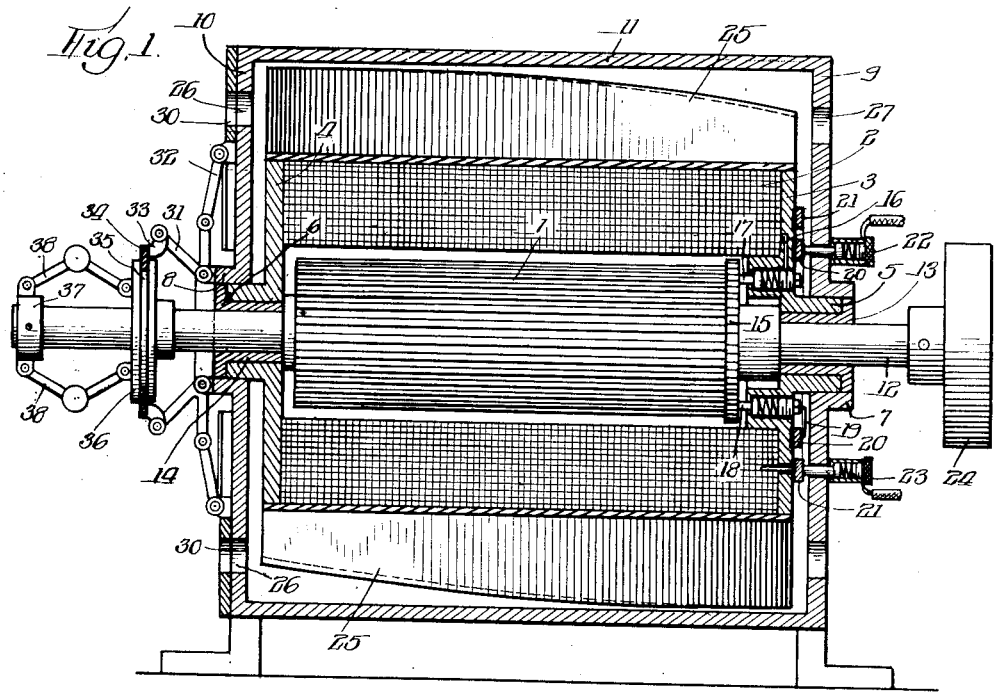
Figure 2:
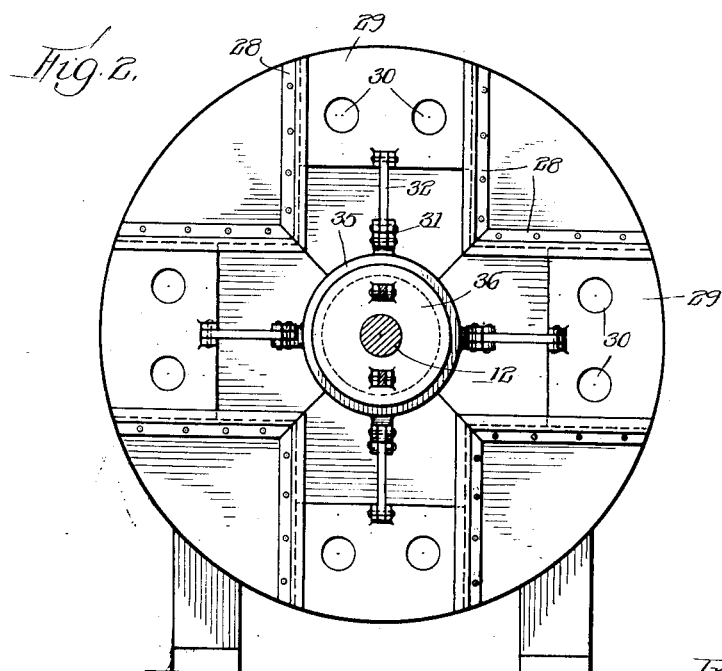
Fig. 2 is a view of the left end of the motor shown in Fig. 1, certain portions having been removed.

In Figs. 1 and 2 of the drawings, 1 indicates the armature and 2 the field of a series wound electric motor. The armature and field are mounted to revolve in opposite directions about a common axis. The field is mounted on disks 3 and 4 having trunnions 5 and 6 journaled in bearings 7 and 8 in the end walls 9 and 10 of the motor frame 11. The armature is mounted on the shaft 12, having a power take-off pulley 24 thereon, and journaled in bushings 13 and 14 in the trunnions 5 and 6. A commutator 15 on the armature 1 is engaged by brushes 17 and 18 mounted in the disk 3 and urged into engagement with the commutator by suitable springs. Rings 20 and 21 are mounted on the outer surface of the disk 3 and are insulated therefrom. The ring 21 is electrically connected to the field 2 and a conductor 16 interconnects the field 2 and the brush 17. A conductor 19 interconnects the brush 18 and the ring 20. Brush structures 22 and 23 insulatingly mounted in the end wall 9 respectively bear on the rings 20 and 21 and the electric connections are made on these brush structures. In this manner a series motor is provided. Fan blades 25 are mounted on the periphery of the field 2. When the field 2 rotates the fan blades draw air into the motor frame 11 through the openings 26 in the end wall 10 and the air is forced from the casing through the openings 27 in the end wall 9. On the end wall 10 guides 28 are provided and supported therein are shutters 29 having openings 30 positioned relative to the openings 26. Bell cranks 31 are pivotally mounted on the bearing 8 and the links 32 extend between corresponding arms of these bell cranks and the shutters 29. Arms 33 are pivotally connected to the other arms of the bell cranks and are fixed to the ring 34 mounted in the groove 35 in the collar 36 slidably mounted on the shaft 12. A collar 37 fixed on the shaft 12 has innately resilient governor arms 38 connected thereto which arms are also connected to the collar 36.

In an ordinary electric motor having a stationary field an increase in normal armature speed simultaneously results in a decrease of the torque. Herein, a relative rotation between the field and armature occurs and an alteration of armature speed will not vary the torque. This is accomplished by disposing the openings 30 to partially close the openings 26 when the motor is operating normally. Upon variation of the armature speed the position of the governor arms 38 changes and thus the movable collar 36 is slid along the shaft 12. Movement of the collar 36 is transmitted through the connections described to the shutters 29 which are moved to vary the registration of the openings 30 and 26. This alters the air supply to the fan blades 25 and, consequently, the load on the field 2. If, for example, the armature speed increases the registration of the openings 26 and 30 is increased to permit greater air supply to the fan blades which increases the load on the field 2 and thus reduces the rotative speed thereof which increases the torque. In this manner the torque is maintained constant. A reduction of armature speed will cause a diminishing of the air supply with a resultant decrease in the load on the field 2 which permits more rapid rotation thereof with a consequent reduction in torque. In this manner the torque is automatically maintained constant upon variation of armature speed. If desired, the shutters may be arranged for manual operation by disconnecting the links 33 from the ring 34 and connecting said links to a manually operable arrangement. A similar shutter arrangement may be provided for controlling the magnitude of the openings 27 which will also vary the load on the fan blades 25.

Figure 3:
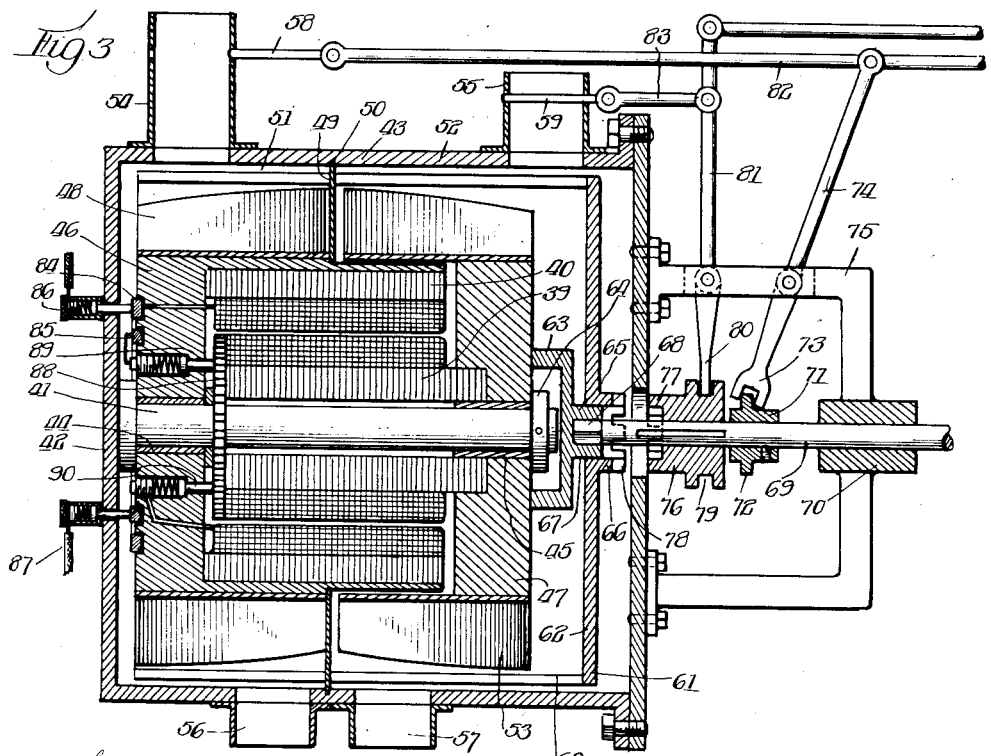
Fig. 3 is a longitudinal sectional view of a motor embodying another form of my invention.

In Fig. 3 a motor is depicted which embodies an armature 39 and a field 40. A shaft 41 is mounted on the end wall 42 of the frame 43 of the motor and has bushings 44 and 45 mounted thereon at opposite ends thereof. A supporting disk 46 is rotatably mounted on the bushing 44 and the field 40 is carried by this disk. A supporting disk 47 is rotatably mounted on the bushing 45 and supports the armature 39 interiorly of the field. A plurality of fan blades 48 are mounted on the supporting disk 46 outwardly of the field 40 and extend axially of the field substantially one-half the length thereof. The end portions of the fan blades 48 are connected to a ring 49 which is rotatably mounted in a groove 50 in the frame 43. The ring 49 divides the interior of the frame 43 into two compartments 51 and 52. The fan blades 48 are operable in the compartment 51. Extending axially from the periphery of the supporting disk 47 are fan blades 53 which are operable in the compartment 52. Inlets 54 and 55 and outlets 56 and 57 communicate with the compartments 51 and 52 respectively. Valve members 58 and 59 control passage through the inlets 54 and 55 and, if desired, similar valve members may be provided in the outlets 56 and 57. Arms 60 extend past the fan blades 48 and 53 from the supporting disk 46 and support a circular plate 61 adjacent the end wall 62 of the frame 43. A bracket 63 is mounted on the supporting disk 47 and has a hollow interior in which the collar 64 on the end of the shaft 41 is disposed, said collar serving to hold the disk 47 on the shaft. Extending from the bracket 63 is a circular boss 65 which is disposed in a bearing 66 on the disk 61. A polygonal socket 67 is formed in the boss 65 and a cooperatively shaped end portion 68 is provided on the inner end of the shaft 69 journaled in the bearing 70. A collar 71 fixed on the shaft 69 has a flange 72 engaged by the bifurcated end 73 of the lever 74 pivotally mounted on the bearing support arm 75. A slidable collar 76 is keyed to the shaft 69 and has a jaw clutch portion 77 on the inner end thereof that is adapted to cooperate with the jaw clutch portion 78 on the outer end of the bearing 66. A peripheral groove 79 is provided in the collar 76 into which the fork end 80 of the lever 81 is fitted, said lever being pivotally mounted on the bearing support arm 75. A link 82 interconnects the lever 74 and the valve 58. A link 83 interconnects the lever 81 and the valve 59. Rings 84 and 85 are mounted on the outwardly disposed face of the supporting disk 46 and are electrically insulated therefrom. Brushes 86 and 87 mounted in the end wall 42 ride on these rings and the line leads are connected to these brushes. On the end of the armature 39 adjacent the supporting disk 46 is a commutator 88 engaged by brushes 89 and 90 mounted in the supporting disk 46. Electrical connections are provided to interconnect the rings, field coils and armature to provide a series wound motor, but it is to be understood that the invention may be used in connection with motors wound in other manners. When the device is set in operation the armature will rotate in one direction and the field in the other. Both the valve members 58 and 59 will be disposed to close passage through the inlets 54 and 55 and, therefore, the fan blades 48 and 53 will operate freely in the compartments 51 and 52. However, by moving the lever 74 the end portion 68 may be disposed in the socket 67 and, therefore, the power receiving shaft 69 will be connected to the armature to receive motion therefrom. Since the lever 74 is connected by the link 82 to the valve 58 it is apparent that movement of said lever will move the valve 58 into open position. Therefore, the fan blades 48 will draw air into the compartment 51 and thus a load will be impressed on the field 40. An arrangement may be provided for varying the air supply to the fan blades 48 to vary the torque of the motor in the manner set forth hereinbefore. When the lever 74 is moved to disengage the end portions 68 from the socket 67 the valve 58 will again be moved into closing position. The lever 81 may then be moved to engage the clutch portion 77 with the clutch portion 78 and, therefore, the power receiving shaft 69 will be connected to the field and will, in this instance, rotate in a direction opposite to the direction of the rotation thereof when connected to the armature. In this instance the valve 59 will be moved from closing position and, therefore, a load will be impressed on the armature 39 by the action of the fan blades 53 on the air admitted through the inlet 55. It is apparent that rotation in opposite directions may be readily imparted to the shaft 69 without interrupting the operation of the motor or in any way altering the electrical connections thereto.

Figure 4:
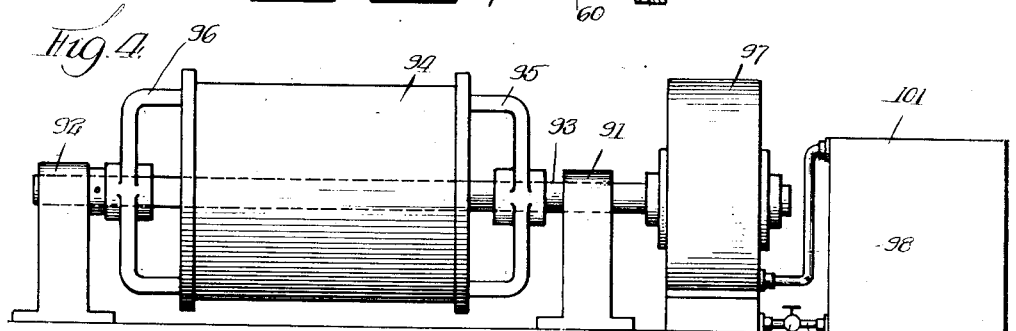
Figs. 4 and 5 are partially diagrammatic views illustrating adaptations of my invention.

In Fig. 4 a motor arrangement is depicted which includes bearings 91 and 92 in which a shaft 93 is journaled. The armature of the motor is mounted on this shaft 93 interiorly of the field supported in a circular frame 94, the periphery of the frame being, in this instance, arranged to provide a pulley. Bearings 95 and 96 are positioned on the shaft 93 and rotatably support the frame 94. A pump 97 is connected to the shaft 93 and includes an inlet 98 and an outlet 99 having a valve 100 therein. In the present instance, both the inlet and the outlet of the pump 97 are shown connected to a tank 101. When the motor is set in operation power may be taken from the frame 94 which, as stated, is in the form of a pulley although other power transmitting means may be provided thereon. The frame 94 will rotate in a direction opposite to the direction of the rotation of the shaft 93 which will be operating the pump 97. By varying the valve 100 the pressure against which the pump 97 is operating may be varied and, therefore, the load on the armature shaft 93 may be varied and this may be employed to alter the torque in the manner hereinbefore set forth.

Figure 5:
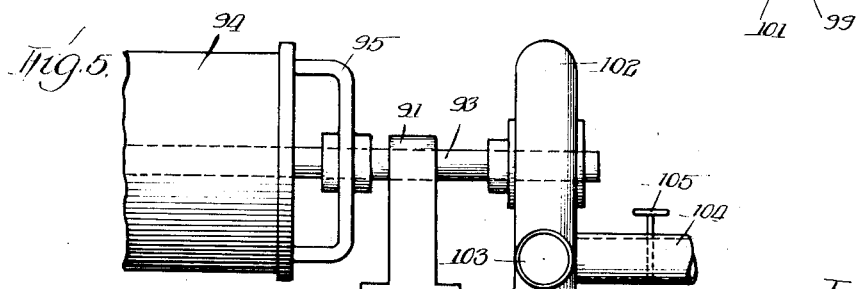

In Fig. 5 the shaft 93 is connected to a centrifugal blower 102 having an outlet 103 and an inlet 104 having a valve 105 therein. By varying the position of the valve 105 the operation of the blower 102 may be controlled and, therefore, the load on the shaft 93 to control the torque of the motor as above described. It is apparent that rotation of the frame 94 may be controlled if desired, and, in this instance, the torque of the shaft 93 will be maintained constant. While I have shown several adaptations of my motor, it is to be understood that it might be used in other ways and under circumstances in which it is desired to provide constant torque, constant speed or a multiple speed variation, or where operation in opposite directions are required. By reason of the flexibility of my construction, it is apparent that either, or both of the moving elements may be directly connected to the machine to be operated under circumstances where such an arrangement would be desirable.

A motor constructed in accordance with the foregoing will substantially obviate likelihood of being burned out by being overloaded or stalled since but one of the elements is connected in a positive manner while the other element is retarded by a yieldable arrangement as, for example, the fan blade structures. Overloading or stalling of the directly connected element of the motor will not in any way interfere with the operation of the other element which will manifestly prevent burning out.

While I have illustrated and described specific constructions of my invention, it is to be understood that these are capable of variation and modification without departing from the purview of the following claims:

I claim:

1. In an electric motor, a field element and an armature element mounted for relative rotation about a common axis, a fan on one of said elements, power receiving means connected to the other element, means enclosing said fan and having openings affording air movement to and from said fan, and means controlling the air movement whereby the rotation of the element carrying said fan relative to the rotation of the element connected to the power receiving means may be varied as the torque in the element connected to the power receiving means varies whereby the torque of the connected element may be maintained constant.

2. In an electric motor, a field element and an armature element mounted for relative rotation about a common axis, a fan on one of said elements, power receiving means connected to the other element, means enclosing said fan and having openings affording air movement to and from said fan, speed responsive means operable with the element connected to the power receiving means, and means controlled by said speed responsive means for regulating the air movement whereby the rotation of the element carrying said fan relative to the rotation of the element connected to the power receiving means may be varied as the torque in the element connected to said power receiving means varies whereby the torque of the connected element may be maintained constant.

3. In an electric motor, an armature and a shaft therefor, a field, means supporting said field for rotation relative to said armature and said shaft, a fan on said field, a frame enclosing said armature, field and fan and having openings therein to permit ingress and egress of air moved by said fan, and means for varying the air movement to vary the load on said fan whereby the speed of rotation of said field may be varied to thereby vary the relative rotation of the field to the armature and shaft.

4. In an electric motor, a frame having a shaft therein, a field and an armature mounted on said shaft for relative rotation thereabout, independent fans on said field and said armature and enclosed by said frame, power receiving means, means for optionally connecting said power receiving means to said field or said armature, means for regulating the operation of said fans, and means operable with the connecting means for controlling operation of the means regulating operation of said fans whereby the load on said fans may be varied to vary the relative rotation of the field and armature.

5. In an electric motor, a frame having a shaft therein, a field element and an armature element mounted on said shaft for relative rotation thereabout, independent fans on said field element and said armature element and enclosed by said frame, power receiving means, means for optionally connecting said power receiving means to said field element or said armature element and for disconnecting the other element, and means for impressing a load on said fans, and means operable with the means for optionally connecting the power delivery means to said field element or said armature element whereby the fan on the element connected to said power receiving means will be unloaded and the fan on the disconnecting element will be loaded whereby operation of the disconnected element may be controlled to thereby control operation of the connected element.

6. In an electric motor, a frame having a shaft therein, a field element and an armature element mounted on said shaft for relative rotation thereabout, independent fans on said field element and said armature element and enclosed by said frame, a partition in said frame providing compartments therein whereby the fan on the field element will operate in one compartment and the fan on the armature element will operate in another compartment, said frame having openings therein communicating with each of said compartments and affording air movement to and from the fans in said compartments, and means controlling the air movement whereby the air movement caused by one of said fans may be retarded while the air movement caused by the other of said fans is free to thereby permit a load to be impressed on the element carrying the fan having the air movement thereof retarded.

7. In an electric motor, a frame having a shaft therein, a field element and an armature element mounted on said shaft for relative rotation thereabout, independent fans on said field element and said armature element and enclosed by said frame, a partition in said frame providing compartments therein whereby the fan on the field element will operate in one compartment and the fan on the armature element will operate in another compartment, said frame having openings therein communicating with each of said compartments and affording air movement to and from the fans in said compartments, means controlling the air movement whereby the air movement caused by one of said fans may be retarded while the air movement caused by the other of said fans is free to thereby permit a load to be impressed on the element carrying the fan having the air movement thereof retarded, a power receiving shaft, means for connecting said power receiving shaft to either of said elements, and means interconnecting said air movement controlling means and said shaft connecting means whereby said shaft will be connected to the element carrying the fan having the free air movement.

8. In an electric motor, a frame, a field element and an armature element in said frame and mounted for relative rotation about a common axis, a fan on said field element, said frame having openings therein affording air movement to and from said fan, a shaft connected to said armature element, speed responsive means carried by said shaft, means controlling the air movement, and means connecting said air movement controlling means to said speed responsive means.

WILLIAM H. PUGSLEY.